US012566088B2

(12) United States Patent
Wang et al.

(10) Patent No.: US 12,566,088 B2
(45) Date of Patent: Mar. 3, 2026

(54) METHOD FOR CONTROLLING DISCHARGE FLOW RATE IN A LOSS-IN-WEIGHT SCALE

(71) Applicants: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

(72) Inventors: Shenhui Wang, Changzhou (CN); Jingke Wang, Changzhou (CN); Qi Wan, Changzhou (CN); Xiaosong Wang, Changzhou (CN); Zhengquan Liu, Changzhou (CN); Gang Yang, Changzhou (CN); Song Zhang, Changzhou (CN)

(73) Assignees: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai). Co., Ltd., Shanghai (CN)

( * ) Notice: Subject to any disclaimer, the term of this patent is extended or adjusted under 35 U.S.C. 154(b) by 700 days.

(21) Appl. No.: 17/912,119

(22) PCT Filed: Mar. 23, 2021

(86) PCT No.: PCT/CN2021/082318
§ 371 (c)(1),
(2) Date: Sep. 16, 2022

(87) PCT Pub. No.: WO2021/190486
PCT Pub. Date: Sep. 30, 2021

(65) Prior Publication Data
US 2023/0139042 A1 May 4, 2023

(30) Foreign Application Priority Data

Mar. 25, 2020 (CN) .......................... 202010217199.9

(51) Int. Cl.
*G01G 11/08* (2006.01)
*G01G 13/24* (2006.01)
(Continued)

(52) U.S. Cl.
CPC ......... *G01G 11/083* (2013.01); *G01G 11/086* (2013.01); *G01G 13/248* (2013.01);
(Continued)

(58) Field of Classification Search
CPC ...... G01G 11/083; G01G 13/24; G01G 17/06; G01G 11/08; G01G 11/086; G01G 13/20;
(Continued)

(56) References Cited

U.S. PATENT DOCUMENTS 4,893,262 A * 1/1990 Kalata .................... G01G 11/12
702/179
5,260,880 A 11/1993 Tump
(Continued)

FOREIGN PATENT DOCUMENTS

CN 101100631 A 1/2008
CN 102147282 A 8/2011
(Continued)

*Primary Examiner* — Timothy R Waggoner
(74) *Attorney, Agent, or Firm* — Standley Law Group LLP; Jeffrey S. Standley; Adam J. Smith

(57) ABSTRACT

A discharge flow rate of a loss-in-weight scale is controlled by continuously changing control outputs to save the time necessary for data stabilization. A curve relating the discharge flow rate and the control output is obtained by using the functional relationship between the control output and time and the functional relationship between the material weight and time. The discharge flow rate can be precisely controlled by directly selecting or inputting a value of the (Continued)

control output, to achieve the objectives of direct controlling and of avoiding the time for data stabilization.

9 Claims, 2 Drawing Sheets

(51) Int. Cl.
*G05B 19/042* (2006.01)
*G05D 7/06* (2006.01)

(52) U.S. Cl.
CPC ....... *G05B 19/0426* (2013.01); *G05D 7/0623* (2013.01); *G05B 2219/2613* (2013.01)

(58) Field of Classification Search
CPC .............. G01G 13/248; G05B 19/0426; G05B 2219/2613; G05D 7/0623
See application file for complete search history.

(56) References Cited

U.S. PATENT DOCUMENTS

| | | | | |
|---|---|---|---|---|
| 8,200,367 | B2 * | 6/2012 | Foley ................... | G01G 13/003 |
| | | | | 700/240 |
| 10,207,878 | B1 | 2/2019 | Johnson et al. | |
| 2012/0055579 | A1 * | 3/2012 | Nufer ................... | G01G 13/003 |
| | | | | 141/83 |

FOREIGN PATENT DOCUMENTS

| | | | |
|---|---|---|---|
| CN | 103968919 | A | 8/2014 |
| CN | 108319214 | A | 7/2018 |
| CN | 109387269 | A | 2/2019 |

* cited by examiner

METHOD FOR CONTROLLING DISCHARGE FLOW RATE IN A LOSS-IN-WEIGHT SCALE

BACKGROUND OF THE INVENTION

Technical Field

The present invention relates to a method for controlling a loss-in-weight scale, and in particular to a method for controlling a discharge flow rate in a loss-in-weight scale.

Background Art

A loss-in-weight scale is a weighing device with intermittent feeding and continuous discharging. Such scales are capable of achieving a relatively high precision of control as loss-in-weight control is performed in a hopper. Additionally, the loss-in-weight scale has a structure for facilitating effective sealing, which makes it suitable for controlled compounding of fine materials such as cement, lime powder, and coal powder.

A typical loss-in-weight scale 100 is shown in FIG. 1 in which an output signal of a meter 101 is used to control a rotational speed of a motor 102, and thus a rotational speed of a screw feeder 103, so as to achieve the objective of quantitative feeding, Meanwhile, a weighing sensor 104 is used to measure the weight of a weighing hopper 105, and the output signal of the meter 101 is adjusted according to the weight information. In other words, when materials in the weighing hopper 105 reach a weighing lower limit level, the screw feeder 103 quantitatively discharges the materials at the current running speed, and at the same time, materials in a feeding hopper 106 are quickly lowered into the weighing hopper 105. The material loading is stopped when the materials are loaded up to a weighing upper limit level.

In the operation of the loss-in-weight scale, it is usually necessary to calibrate the relationship between the discharge flow rate and the control output of the meter so as to establish an initial value of control output at the start of the loss-in-weight scale, so that the meter quickly and steadily achieves the target flow rate control.

Existing calibration methods typically record current flow rates at several control outputs of the device. While it is stable, the test data is recorded, and a model representative of the relationship between the flow rate and the control output is generated. For example, if the maximum value of the control output of the meter is T, which indicates that the motor is operating at the highest rotational speed V, then when the control outputs of the meter are respectively 20% T, 40% T, 60% T, 80% T, and 100% T, the corresponding rotational speeds of the motor are respectively 20% V, 40% V, 60% V, 80% V, and 100% V. First, the control output of the meter is set to 20% T, then a time period of about 30 seconds is allowed to elapse for the data to be stable, and a discharge flow rate at the end of the time period is recorded to form a first set of test data. In the same way the other four sets of test data are established. A function curve representative of the relationship between the discharge flow rate and the control output is generated by fitting the five sets of test data. During subsequent normal operation, the control of the loss-in-weight scale is implemented using the curve.

In the existing calibration method, because the switching of control outputs may result in unstable data of flow rate measurements, the measurements should be performed for an extended period of time to allow the data to be stable and flow rate data can be collected only after that, which as a consequence consumes more time and results in spending more materials for completing the calibration.

In addition, the existing calibration method is to generate the calibration curve from only several sets of calibration data, and the generated calibration curve is merely an approximation of the several sets of data, which has a precision that is not high.

SUMMARY

In view of the disadvantages mentioned above, an objective of the present invention is to provide a method for controlling a discharge flow rate, such that the control outputs are continuously changed to avoid the time necessary for data stabilization, and a discharge flow rate can be precisely controlled by directly selecting or inputting a value of the control output. This method is simple and easy to operate, and has a precise control.

The present invention provides a method for controlling a discharge flow rate of a loss-in-weight scale, the method comprising: setting different sampling points, and values of control outputs of a meter that correspond to the sampling points; calculating, according to the values of the control outputs of the meter, a functional relationship between the control output and time; calculating, according to weights of remaining materials in a weighing hopper at the sampling points, a functional relationship between the weight and time; and calculating a functional relationship between a discharge flow rate of a screw feeder and the control output by using the functional relationship between the control output and time and the functional relationship between the weight and time.

In the present invention, the functional relationship between the control output and time is calculated from the values of the control outputs and the functional relationship between the weights of the remaining materials and time is calculated from the weights, respectively, so as to obtain the functional relationship between the discharge flow rate and the control output, which is simple, reliable, and is convenient to operate.

Further, the sampling points are set at equal time intervals or at unequal time intervals.

To make the functional relationship between the control output and time more precise, setting the value of the control output is performed at equal time intervals or unequal time intervals, and the interval time between settings should be as short as possible i.e., sampling points should be as many as possible, so as to make a functional relationship between the value of a subsequent control output and time more precise. With a shortened time interval, there is no need to waft for data to become stable at each sampling point.

Further, the value of the control output increases from 0 to a maximum value of the control output.

The value of the control output is set to increase from 0 to the maximum value, which, together with the various sampling points, makes the functional relationship between the value of the subsequent control output and time more precise.

Further, the slope at any location on a curve corresponding to the functional relationship between the control output and time is less than or equal to a defined value for the given loss-in-weight scale.

In the present invention, the slope at any location on the curve obtained from the functional relationship between the control output and time has a value, that is, the curve is smooth and has no singularity. The range of the slope is determined by characteristics of the loss-in-weight scale system, such as the fluidity of materials and the response speed of the device. For a particular loss-In-weight scale, given the various components of the device, a defined value of the loss-in-weight scale is obtained through different tests and measurements.

Further, the functional relationship between the control output and time is a linear, or exponential, or quadratic curve relationship. Alternatively, the functional relationship is a curve relationship that is obtained by an arbitrary combination of the aforementioned three curve relationships.

The relationship between the control output and time is fitted by using a mathematical method according to an existing functional model, which is convenient to operate and is highly efficient.

Further, calculating the functional relationship between the discharge flow rate and time by using the functional relationship between the weight of the remaining materials and time, and then calculating the functional relationship between the discharge flow rate and the control output by using the functional relationship between the discharge flow rate and time and the functional relationship between the control output and time.

Calculating the functional relationship between the discharge flow rate and the control output by using the mathematical method is convenient to operate and is highly efficient.

Further, correlations among the value of the control output of the meter, a running speed of a motor, and a rotational speed of the screw feeder are set.

In the present invention, after the relationships among the value of the control output of the meter, the running speed of the motor, and the rotational speed of the screw feeder are sequentially set, sampling is performed by the method mentioned above to obtain the functional relationship between the control output and time and the functional relationship between the material weight and time, such that the functional relationship between the discharge flow rate of the screw feeder and the control output is calculated. Then, the discharge flow rate can be precisely controlled by directly selecting or Inputting the value of the control output, to achieve the objectives of direct controlling and of avoiding the time for data stabilization.

The present invention further provides a loss-in-weight scale, in which a method for controlling a discharge flow rate as mentioned above is applied.

The present invention further provides a storage medium comprising a stored program that, when being run, controls an apparatus where the storage medium is located to carry out a method for controlling a discharge flow rate.

In summary, in the present invention, the control outputs are continuously changed to avoid the time for data stabilization, and a curve of relationship between the discharge flow rate and the control output is obtained by using the functional relationship between the control output and time and the functional relationship between the material weight and time. Then, the discharge flow rate can be precisely controlled by directly selecting or inputting the value of the control output, to achieve the objectives of direct controlling and of avoiding the time for data stabilization.

BRIEF DESCRIPTION OF THE DRAWINGS

The accompanying drawings are included to provide a further understanding of the present invention and are incorporated in and constitute a part of the present application, show the embodiments of the present invention, and serve to, together with the description, explain the principles of the present invention. In the drawings.

DETAILED DESCRIPTION OF EMBODIMENTS

Figure 1:
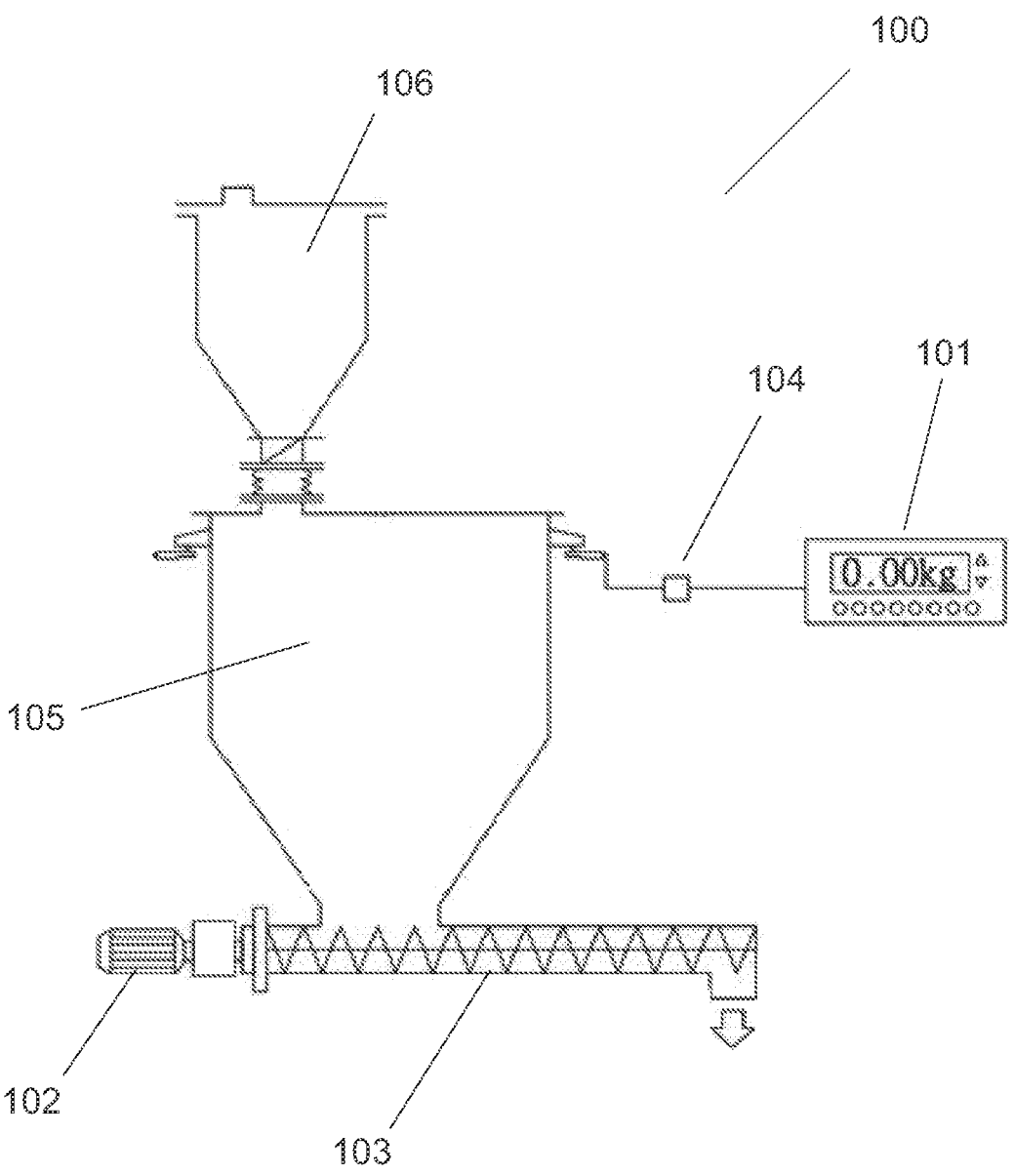
FIG. 1 shows a schematic structural diagram of a typical loss-in-weight scale.
Figure 2:
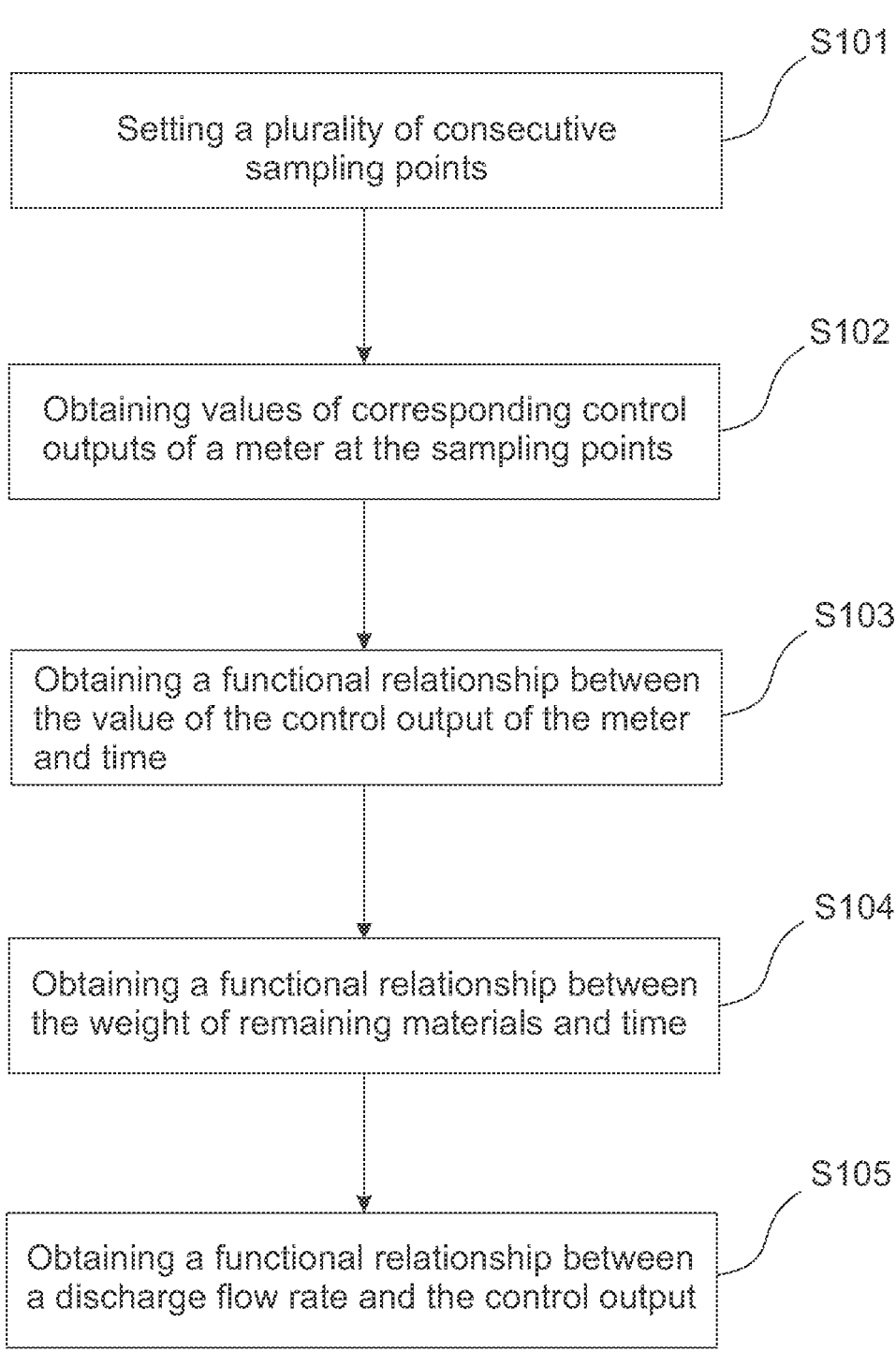
FIG. 2 shows a flowchart of a method for controlling a discharge flow rate that is applied to a loss-in-weight scale in the present invention.

FIG. 1 shows a schematic structural diagram of a loss-in-weight scale. FIG. 2 shows a flowchart of a method for controlling a discharge flow rate that is applied to a loss-in-weight scale.

In the loss-in-weight scale 100, a maximum value of a control output of the meter 101 is T. The entire device starts to operate after being powered on, and the control output of the meter 101 is set to be 1% T. After the operation of the entire device is stable, that is, at a control output controlled at 1% T, quantitative discharging is started with the sequential control of the motor 102 and the screw feeder 103.

In step S101, the control output Cr of the meter 101 is set to increase at a constant speed, from 1% T to 100% T. In step S102, the speed of increase in the control output Cr is set by a user as needed. If the speed corresponds to the value of the control output Cr increasing by 3% T per second, it takes 33 seconds for the control output Cr to increase from 1% T to 100% T, then 33 sets of values for the control output Cr and time t can be obtained, and a functional relationship Cr=f1(t) between the control output Cr and time tis obtained by using a mathematical fitting method, as shown in step S103.

To make the functional relationship between the control output and time more precise, the speed of increase in the value of the control output is reduced, for example, the value is set to increase by 1% T, 0.5% T, 0.1% T, etc. per second.

At any point of time the value of the control output corresponds to the running speed of the motor 102, that is, the motor 102 has different running speeds, depending on different values of control outputs. Meanwhile, under the control of different running speeds of the motor 102, the screw feeder 103 also has different rotational speeds, that is, having different discharge speeds.

In step S104, at 33 different points of time mentioned above, materials are discharged under the control of the different values of control outputs, and the weighing sensor 104 is used to weigh materials in the weighing hopper 105 to obtain the weight W of remaining materials. Then, 33 sets of values for the material weight W and time t can be obtained, and a functional relationship W=f2(t) between the weight W of the remaining materials and time tis obtained by using the mathematical fitting method.

A functional relationship F=f2'(t) between the flow rate F and time can be obtained by derivation of the functional relationship between the weight W of the remaining materials and time t by using a mathematical method. A functional relationship F=h(Cr) between the control output Cr and the flow rate F can be obtained also by using the mathematical method according to the functional relationship between the control output Cr and time t and the functional relationship between the flow rate F and time.

According to the functional relationship F=h(Cr) between the control output Cr and the flow rate F, as shown in step S105, the value of the control output Cr can be directly set in the meter 101 to realize the adjustment of the value of the discharge flow rate F. This method is simple and reliable, and is easy to operate, and avoids the problem that the switching of control outputs may result in unstable data of flow rate measurements, thereby saving time and reducing material wastage.

In the embodiment described above, the speed of the control output Cr increases linearly, that is, the functional relationship between the control output Cr and time t is a linearly increasing relationship. In another embodiment, the functional relationship between the control output Cr and time t is set to a quadratic functional relationship, or an exponential relationship, or another curve relationship, wherein the curve is smooth and continuous, and the slope at any location on the curve is less than or equal to a defined value of a loss-in-weight scale system.

The defined value of the loss-in-weight scale system is determined by characteristics of materials and the loss-in-weight scale system, such as the fluidity of the materials and the response speed of the device respectively. For a particular loss-in-weight scale, given the various components of the device, a defined value of the loss-in-weight scale is obtained through different tests and measurements.

In the present invention, the control outputs are continuously changed by using a plurality of sampling points, such that the time for data stabilization is avoided. After relationships among the value of the control output of the meter, the running speed of the motor, and the rotational speed of the screw feeder are sequentially set, sampling is performed by the method mentioned above to obtain the functional relationship between the control output and time and the functional relationship between the material weight and time, such that the functional relationship between the discharge flow rate of the screw feeder and the control output is calculated. Then, the discharge flow rate can be precisely controlled by directly selecting or inputting the value of the control output, so as to achieve the objectives of direct controlling and of avoiding the time for data stabilization.

It can be learned from the description of the control method above that, a person skilled in the art may clearly understand that the present invention may be implemented by means of software plus a necessary hardware platform. Based on such an understanding, the technical solution of the present invention, in essence or the contribution to the prior art, may be embodied in the form of a software product, and the computer software product may be stored in a storage medium, including but not limited to a ROM/RAM (Read-Only Memory/Random Access Memory), a magnetic disk, and an optical disk, which includes several instructions that cause one or more computer devices (which may be a personal computer, a server, or a network device) to carry out the methods described in various embodiments or some parts in the embodiment of the present invention.

The control method in the present invention may be described in a general context of a computer executable instruction executed by a computer, for example, a program module. Generally, the program module includes a program, an object, a component, a data structure, etc. for performing a specific task or implementing a specific abstract data type. The present invention may also be practiced in distributed computing environments where a task is performed by a remote processing device that is connected through a communications network. In the distributed computing environments, the program module may be located in local and remote computer storage media, including a storage device.

It can be apparent for a person skilled in the art that various modifications and variations may be made to the exemplary embodiments of the present invention without departing from the spirit and scope of the present invention. Therefore, it is intended that the present invention covers the modifications and variations of the present invention that fall within the scope of the appended claims and their equivalents.

REFERENCE SIGNS LIST

100 Loss-in-weight scale
101 Meter
102 Motor
103 Screw feeder
104 Weighing sensor
105 Weighing hopper
106 Feeding hopper

The invention claimed is:

1. A method for controlling a discharge flow rate of a loss-in-weight scale having a meter, a motor, and a screw feeder, said method comprising the steps of:
   setting a plurality of consecutive sampling points, and setting a plurality of values of control output of the meter, each of said values of the control output corresponding to a respective one of the sampling points;
   calculating, according to the values of the control output of the meter, a functional relationship between said values of the control output and time;
   calculating, according to determined weights of materials remaining in a weighing hopper at the sampling points, a functional relationship between the weights and time; and
   calculating a functional relationship between determined discharge flow rates of the screw feeder and said values of the control output by using the functional relationship between said values of the control output and time and the functional relationship between the weights and time;
   wherein a slope at any location on a curve corresponding to the functional relationship between the control output and time is less than or equal to a defined value for the loss-in-weight scale; and
   wherein the functional relationship between the control output and time is a linear, exponential, or quadratic curve relationship, or is a curve relationship that is obtained by an arbitrary combination of the linear exponential, or quadratic curve relationship.

2. The method of claim 1, wherein the sampling points are set at equal time intervals.

3. The method of claim 1, wherein the values of the control output increase from 0 to a maximum one of said values of the control output.

4. The method of claim 1, further comprising the steps of:
   calculating a functional relationship between the discharge flow rates and time by using the functional relationship between the weights of the remaining materials and time; and
   calculating the functional relationship between the discharge flow rates and said values of the control output by using the functional relationship between the discharge flow rates and time and the functional relationship between said values of the control output and time.

5. The method for controlling a discharge flow rate of a loss-in-weight scale according to claim 1, further comprising the step of:
   sequentially setting correlations among the values of the control output of the meter, a running speed of the motor, and the rotational speed of the screw feeder.

6. A loss-in-weight scale configured to implement the method for controlling the discharge flow rate of claim 1.

7. The method of claim 1, wherein the sampling points are set at unequal time intervals.

8. A method for controlling a discharge flow rate of a loss-in-weight scale comprising a meter, a motor, and a screw feeder using a calibration technique that reduces adjustment time, said method comprising:

setting a plurality of consecutive sampling points, and setting a plurality of values of control output for the meter, each of said values of the control output corresponding to a respective one of the sampling points;

operating the loss-in-weight scale with the values of the control output over time, including receiving weights of materials remaining in a weighing hopper of the loss-in-weight scale at the sampling points;

calculating a functional relationship between the values of the control output and time such that applying different time values to the functional relationship results in output of different control values;

calculating a functional relationship between the weights of materials remaining in the weighing hopper and time such that applying different time values to the functional relationship results in output of different expected weights of materials remaining in the weighing hopper;

calculating a functional relationship between determined discharge flow rates of the screw feeder and the values of the control output by using the functional relationship between the values of the control output and time and the functional relationship between the weights and time such that applying different values of the control output to the functional relationship results in output of different discharge flow rates of the screw feeder; and operating the loss-in-weight scale according to the functional relationship between the discharge flow rates of the screw feeder and the values of the control output at a further time such that applying different desired discharge flow rates results in the loss-in-weight scale operating with different values of the control output;

wherein a slope at any location on a curve corresponding to the functional relationship between the control output and time is less than or equal to a defined value for the loss-in-weight scale; and wherein the functional relationship between the control output and time is a linear, exponential, or quadratic curve relationship, or is a curve relationship that is obtained by an arbitrary combination of the linear, exponential, or quadratic curve relationship.

9. A loss-in-weight scale for controlling a discharge flow rate using a calibration technique that reduces adjustment time, said loss-in-weight scale comprising:

a meter;

a motor;

a screw feeder; and one or more non-transitory electronic storage devices comprising software instructions, which when executed, configure one or more processors to:

set a plurality of consecutive sampling points, and set a plurality of values of control output for the meter, each of said values of the control output corresponding to a respective one of the sampling points;

operate the loss-in-weight scale with the values of the control output over time, including receiving weights of materials remaining in a weighing hopper of the loss-in-weight scale at the sampling points;

calculate a functional relationship between the values of the control output and time such that applying different time values to the functional relationship results in output of different control values;

calculate a functional relationship between the weights of materials remaining in the weighing hopper and time such that applying different time values to the functional relationship results in output of different expected weights of materials remaining in the weighing hopper;

calculate a functional relationship between determined discharge flow rates of the screw feeder and the values of the control output by using the functional relationship between the values of the control output and time and the functional relationship between the weights and time such that applying different values of the control output to the functional relationship results in output of different discharge flow rates of the screw feeder; and operate the loss-in-weight scale according to the functional relationship between the discharge flow rates of the screw feeder and the values of the control output at a further time such that applying different desired discharge flow rates results in the loss-in-weight scale operating with different values of the control output;

wherein a slope at any location on a curve corresponding to the functional relationship between the control output and time is less than or equal to a defined value for the loss-in-weight scale; and wherein the functional relationship between the control output and time is a linear, exponential, or quadratic curve relationship, or is a curve relationship that is obtained by an arbitrary combination of the linear, exponential, or quadratic curve relationship.

* * * * *